March 7, 1961 G. P. SALIARIS 2,973,903
TEMPERATURE CONTROL APPARATUS
Filed March 5, 1959

INVENTOR.
GEORGE P. SALIARIS
BY
ATTORNEY.

United States Patent Office 2,973,903
Patented Mar. 7, 1961

2,973,903

TEMPERATURE CONTROL APPARATUS

George P. Saliaris, Worthington, Ohio, assignor to Ranco Incorporated, Columbus, Ohio, a corporation of Ohio Filed Mar. 5, 1959, Ser. No. 797,509

1 Claim. (Cl. 236—42)

The present invention relates to a thermostatically actuated control apparatus, such as a valve, for regulating the flow of a heating or cooling medium through a heat exchanger to maintain a desired temperature condition, the apparatus providing manual selective adjustment of the temperature.

The principal object of the invention is the provision of control apparatus comprising a control device which is actuated by a thermally responsive element through a floating lever which is carried by the element and which engages a manually positionable fulcrum member so that movement of the element in response to temperature changes causes the lever to swing about the fulcrum member to thereby actuate the control device. The position of the fulcrum member is selectively shifted manually relative to the thermally responsive element so that a greater or lesser degree of movement of the element is required to actuate the control device, thereby effecting control of the temperature producing medium to provide a selected temperature.

By the arrangement mentioned, the lever need not be pivoted to a frame or other fixed support, and the components of the apparatus, including the fulcrum shifting mechanism, can be mounted on a support consisting of a plate-like member, resulting in a relatively low cost but accurate and easily adjusted control apparatus.

Figure 1:
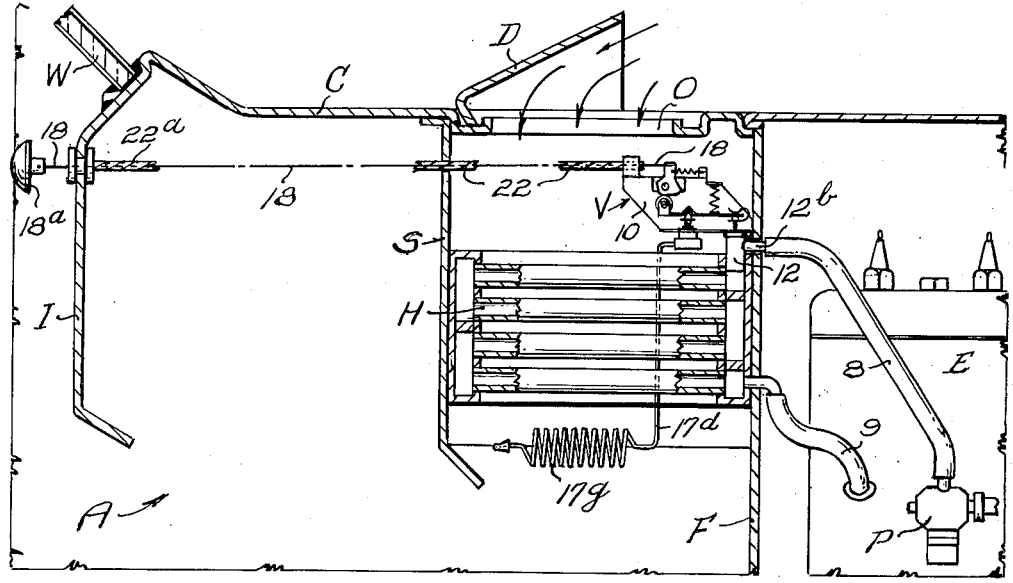
Figure 2:
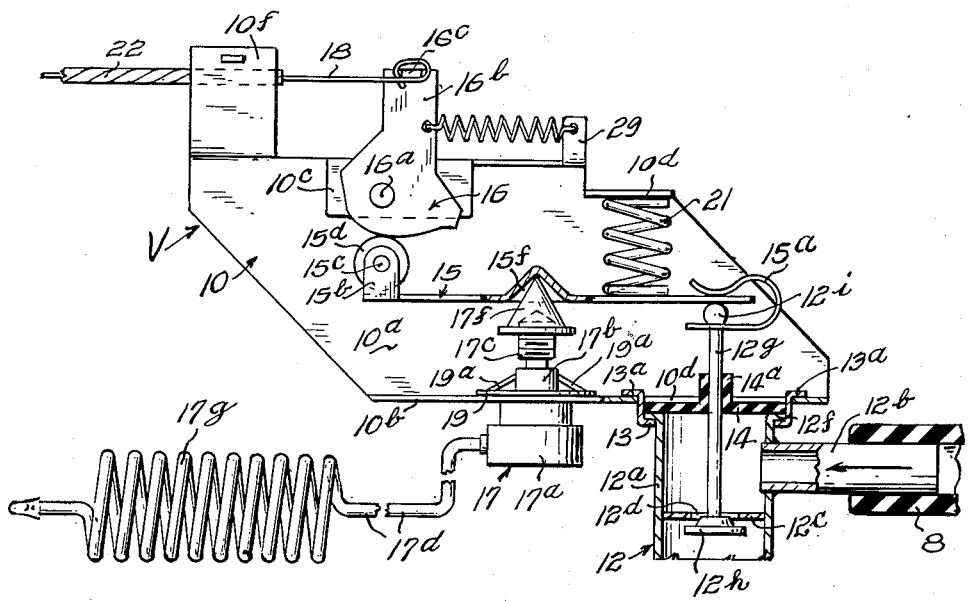

Other objects and advantages of the invention will be apparent from the following description of the preferred embodiment of the invention reference being made to the accompanying drawings wherein Fig. 1 is a fragmentary, sectional view of a passenger automobile having a heating system regulated by a control valve embodying the invention, and, Fig. 2 is a side view of the control valve, a portion of the valve being shown broken away.

Although the invention could be embodied in valves or electric switches for controlling various types of temperature producing systems, the preferred form shown comprises a valve for regulating the flow of liquid from the cooling system of an automobile engine through a radiator type heater arranged to heat air for the passenger compartment of an automobile. Such heating systems are well known and the components thereof shown are more or less schematic for sake of simplicity.

Referring to Fig. 1, a portion of a conventional passenger automobile A is shown, including the usual firewall F, a cowl C, windshield W, instrument panel I and an internal combustion type engine E forward of the firewall. Cowl C has an opening O therein and a deflector D for deflecting air inwardly through the opening and downwardly through a duct into the passenger compartment. The duct is formed by a sheet metal channel having its open side attached to firewall F. A heat exchanger or heater H is located in the duct and in the path of air passing down therethrough. The heater is a conventional radiator type having opposed headers interconnected by a series of tubes through which liquid from the cooling system of the automobile engine passes and around which the incoming air circulates to become warmed. Engine E has a well known liquid coolant type cooling system and the coolant is circulated from the engine cooling jacket through a radiator, not shown, by a pump P. Liquid from pump P is also directed to heater H through tubing 8 and returned to the engine block from the heater through a tubing 9. The flow of liquid through the heater is automatically controlled by the improved valve V to provide for a constant temperature of air discharged from the heater, according to the setting of a temperature regulating knob described more fully hereinafter.

Referring to valve V as shown in Fig. 2, the valve mechanism preferably comprises, in general, a unitary frame 10 having a control device in the form of a fluid control valve mechanism 12 attached to the frame, an operating lever 15 connected at one end to the valve, a fulcrum member in the form of a cam 16 carried by the frame and engaged by the other end of the lever to form a pivot about which the lever is moved in response to changes in temperature of a thermally responsive element 17 carried by the frame and engaging the central portion of the lever so that upward movement of the movable part of the thermal element causes the lever to fulcrum about member 16 to actuate the valve, the position of the fulcrum member relative to the thermally responsive element being manually adjustable so that the degree of movement of the thermally responsive element to shift the valve to close off or increase the flow of liquid through the valve may be selectively varied.

Frame 10 is formed of a sheet metal stamping comprising a plate 10a having the bottom portion turned forwardly at right angles thereto to provide a flange 10b on which valve 12 and thermally responsive element 17 are mounted. A top portion 10c of the frame is turned outwardly and then downwardly, as viewed in the drawings, to form a strip-like bracket to which the cam 16 is pivotally attached.

Valve mechanism 12 comprises a tubular body 12a having an inlet tube 12b brazed thereto in one side thereof, the bottom end being open and adapted for connection to the inlet of the heater. An annular valve port disc 12c is brazed in body 12a below inlet 12b and has an opening 12d which forms a valve port through which fluid may pass from the inlet out through the lower end of the body. The upper end of body 12a is attached to flange 10b in axial alignment with an opening 10d in the flange by an annular ring 13 through which the body projects and which bears against a bead 12f formed about the upper end of the body. Ring 13 has lugs 13a formed thereon which project through slots in flange 10b and which are bent against the top surface of the flange to secure the valve body to the underside of the latter. The upper end of body 12a is closed by a flexible diaphragm 14, which may be of suitable rubber-like material and which is interposed between the end of the body and flange 10b. A valve stem 12g having a valve plate 12h attached to the lower end projects through opening 10d and extends through a neck 14a on diaphragm 14. Valve plate 12h cooperates with the underside of annular disc 12c to throttle or open port 12d to the flow of liquid according to axial movement of the stem. Neck 14a forms a liquid-tight seal with stem 12g so that the stem can move longitudinally relative to body 12a without loss of liquid therearound. The upper end of stem 12g has a ball 12i thereon, the purpose of which will be explained further hereinafter.

Lever 15 is yieldingly connected with valve stem 12g by a flat C-shaped spring 15a, the upper leg of which engages the upper side of the lever and the parallel lower leg of which extends beneath the lever, the lower leg being slotted to receive the stem immediately beneath ball 12*i* so that the edges of the slot engage the underside of the ball to hold the stem yieldingly against the underside of the lever. The strength of spring 15*a* is such as to maintain stem 12*g* to lever 15 under all normal conditions, but will flex to permit the lever to separate from the stem in the event the force of the thermally responsive element 17 develops beyond that safe to apply to the valve stem.

The left hand end of lever 15 has a pair of parallel spaced lugs 15*b*, only one of which appears in the drawing, which support a pin 15*c* on which a roller 15*d* is journaled and which roller rides on the periphery of cam 16 so that the cam forms a fulcrum member about which the lever pivots to actuate valve stem 12*g*. Cam 16 is journaled on a pin 16*a* attached to bracket 10*c* which locates the cam directly above roller 15*d*.

Cam 16 is shaped so that as it is rotated couter-clockwise about pin 16*a*, the radius of the portion engaged by roller 15*d* increases to thereby depress the left hand end of lever 15. To selectively set cam 16, an arm 16*b* is formed thereon which has a forwardly turned lug portion 16*c* to which one end of a wire 18 attached by a loop connection so that the cam can be rotated about its pivot by the wire moving longitudinally according to the manual setting of a knob 18*a* attached to the wire, as described more fully hereinafter.

The thermally responsive element 17 is preferably similar to that disclosed in U.S. Patent No. 2,843,151 and in general comprises a base 17*a* having a rigid sleeve 17*b* projecting upwardly therefrom and through an opening through flange 10*b*. A spring tooth retaining washer 19 on the upper surface of flange 10*b* surrounds sleeve 17*b* and fingers 19*a* thereof engage the sleeve to firmly secure the upper portion of base 17*a* to the underside of the flange. A plunger 17*c* projects from sleeve 17*b* and moves in and out of the sleeve according to the changes in volume of a thermally responsive liquid confined within a capillary tube 17*d* communicating with the interior of base 17*a*, as is described in the aforementioned patent. The outer end of plunger 17 has a conical cap 17*f* threaded thereon so that the effective length of the plunger can be initially adjusted by rotating the cap on the threads of the plunger, and the apex of the cap pivotally engages lever 15 in a coniform recess 15*f* formed in the lever. Preferably, tube 17*d* is coiled at its outer end, as shown at 17*g*, so that a major portion of the liquid of the thermally responsive element responds to the temperature at the area occupied by the coil and the changes in volume of the liquid occasioned by its change in volume is reflected by movement of plunger 17*c*.

Preferably, a compression spring 21 is interposed between lever 15 and a forwardly projecting ledge 10*d* formed by a portion of plate 10 bent forwardly over the lever, and this spring urges the lever to the cap 17*f* of element 17 and pivots it clockwise, as viewed in the drawings, tending to close the valve and to place a returning load on plunger 17*c*.

A tension spring is connected between arm 16*b* and a lug 29 formed on plate 10 so as to counterbalance the tendency of lever 15 to rotate cam 16 counterclockwise about its pivot as the lever is forced against the cam by the action of element 17 and spring 21. It will be understood that the centers of pivot 15*c* for roller 15*d* and pivot 16*a* lie on a line more or less tangential to the general arc of movement of the roller about a center formed by cap 17*f* engaging lever 15. Likewise, the centers of ball 12*i*, cap 17*f*, roller 15*d* and cam 16 preferably lie in a straight line and this alignment minimizes side thrusts on plunger 17*c* of power element 17.

Valve V is preferably attached to the upper portion of heater H with inlet 12*b* connected to tube 8 and the outlet of body 12 discharging directly into the upper right hand header of the heater. Capillary tube 17*d* of thermally responsive element 17 is extended with the coil 17*g* disposed in a position in which the air discharge from heater H passes therethrough so that the element responds to the temperature of the discharge air. It will be understood that capillary tube 17*d* could be disposed in any other suitable portion of the vehicle to provide desired temperature regulation.

Preferably, wire 18 for controlling the position of cam 16 is encased for the most part in a metal sheath 22 secured at one end to a tab 10*f*, projecting upwardly from plate 10*a* and extending through an opening in instrument panel I to which it is suitably secured, as by a bushing 22*a*. Wire 18 projects from the left hand end of sheath 22 and knob 18*a* is attached thereto so that the driver of the automobile can shift cam 16 thereby to adjust the temperature desired to be maintained inside the passenger compartment as described hereinbelow.

It will be seen that when the temperature of the liquid in coil 17*g* of the thermally responsive element is relatively low, plunger 17*c* will be in a receded position with respect to sleeve 17*b* so that spring 21 tilts lever 15 clockwise and opens valve port 12*d* to cause a full flow of coolant liquid to pass through heater H. As the temperature of the liquid in coil 17*g* increases, plunger 17*c* is forced outwardly of sleeve 17*b* thereby raising lever 15 and tilting it counterclockwise about the fulcrum formed by roller 15*d* engaging cam 16 so that valve member 12*h* is moved toward port 12*d* to throttle or shut off the flow of liquid through the heater. By the actions just described, the temperature of the air discharging from the heater is automatically maintained constant.

To increase the temperature of the discharge air, cam 16 is rotated counterclockwise by drawing knob 18*a* to the left which results in causing the left hand end of lever 15 to be raised by plunger 17*c* a greater distance than formerly to cause throttling of the valve, and consequently a higher temperature is required at coil 17*g* before the flow of heating liquid is throttled.

Likewise, to reduce the temperature of the discharged air, knob 18*a* is moved toward the instrument panel to rotate cam 16 clockwise so that the fulcrum point of lever 15 on the cam is lowered relative to element 17 whereby a lesser degree of upward movement of plunger 17*c* causes valve 12*h* to throttle or close port 17*d*.

It will be seen that by properly adjusting the height of cap 17*f* on plunger 17*c*, the temperature range of adjustment can be established during the manufacture of the apparatus.

By the combination of parts disclosed, lever 15 "floats" on cap 17*f* and requires no pivot structure on the frame, as is common practice in the art. Also, by causing lever 15 to fulcrum about cam 16, the cam may be supported by an exceedingly simple structure, providing easy manual manipulation of temperature adjustments. Furthermore, an extremely simple, rigid frame structure, formed of a single sheet metal stamping can be employed without sacrifice of accuracy of operation of the various relatively movable parts.

While the preferred form of the invention has been disclosed as embodied in a valve it will be apparent that the invention can be applied to types of control devices and it is to be understood that the claim is not necessarily limited thereto and that other forms, modifications and adaptations of the invention may be adapted by those skilled in the art, all falling within the claim which follows.

I claim:

A control apparatus comprising a sheet metal frame plate having one edge portion turned outwardly to form a flange projecting laterally from one surface thereof and having a portion adjacent to the edge opposite said flange offset from said one surface of said plate and parallel to said plate proper, a valve mechanism attached to said flange adjacent to one end thereof and extending beyond said plate, said valve mechanism having an operating member projecting through an opening in said flange, a condition responsive element attached to said flange and having a part projecting toward said opposite edge of said plate and movable in response to changes in a condition, a lever attached at one end to said operating member of said valve mechanism and having its intermediate portion pivotally engaged by said part of said condition responsive element, a roller attached to the other end of said lever, a cam formed of sheet metal and pivoted to the opposite portion of said plate and having a cam edge engaged by said roller on said lever, said cam having an arm projecting beyond said opposite edge of said plate, an actuating member attached to said arm, and spring means urging said lever about said part in a direction tending to engage said roller with said cam surface.

References Cited in the file of this patent

UNITED STATES PATENTS

| | | |
|---|---|---|
| 1,477,277 | Milker | Dec. 11, 1923 |
| 1,872,147 | Johnson | Aug. 16, 1932 |
| 1,950,240 | Hilgenberg | Mar. 6, 1934 |
| 2,538,212 | Raney | Jan. 16, 1951 |
| 2,565,713 | Allen | Aug. 28, 1951 |
| 2,858,076 | Raney | Oct. 28, 1958 |